Aug. 15, 1961     B. H. BEEBEE     2,996,108
APPARATUS FOR THE MANUFACTURE OF PNEUMATIC TIRES
Filed Aug. 21, 1957     3 Sheets-Sheet 1

INVENTOR
Brian Harry Beebee
by Benj. J. Rauber
his attorney

Aug. 15, 1961     B. H. BEEBEE     2,996,108
APPARATUS FOR THE MANUFACTURE OF PNEUMATIC TIRES
Filed Aug. 21, 1957     3 Sheets-Sheet 2

INVENTOR
Brian Harry Beebee
by Benj. T. Rauber
his attorney

Aug. 15, 1961   B. H. BEEBEE   2,996,108
APPARATUS FOR THE MANUFACTURE OF PNEUMATIC TIRES
Filed Aug. 21, 1957   3 Sheets-Sheet 3
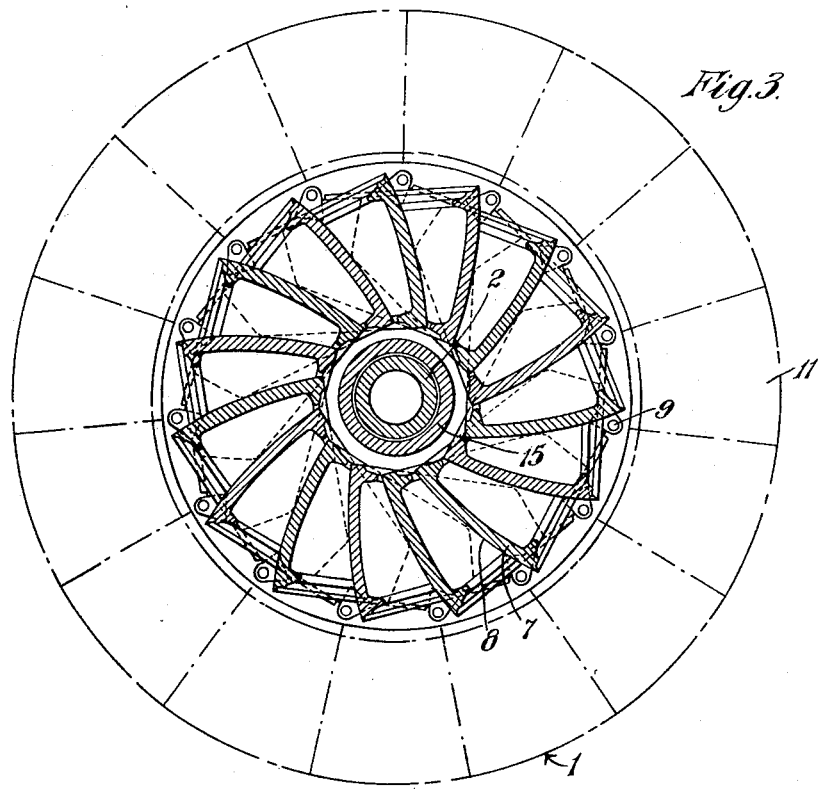
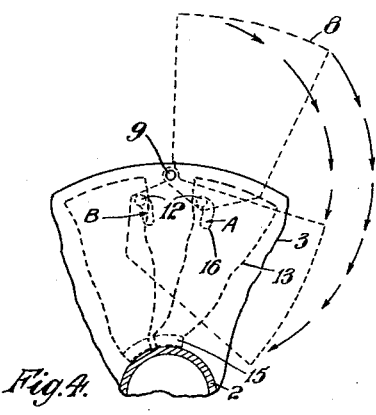
INVENTOR
Brian Harry Beebee
by Benj. T. Rauber
his attorney

United States Patent Office 2,996,108
Patented Aug. 15, 1961

2,996,108
APPARATUS FOR THE MANUFACTURE OF PNEUMATIC TIRES
Brian Harry Beebee, Walsall, England, assignor to Dunlop Rubber Company Limited, London, England, a British company
Filed Aug. 21, 1957, Ser. No. 679,372
Claims priority, application Great Britain Aug. 23, 1956
10 Claims. (Cl. 154—9)

This invention relates to apparatus for the manufacture of pneumatic tires.

It is an object of the present invention to provide a collapsible tire building invention which is effectively and simply collapsed and which is particularly useful in the manufacture of pneumatic tire covers of the kind described in co-pending application of Trevaskis Ser. No. 491,295 for Pneumatic Tires filed March 1, 1955, now Patent No. 2,906,314.

According to the invention a collapsible tire building former comprises a shaft, a pair of axially spaced-apart supporting members rigidly attached to the shaft, a plurality of segments which together form the building surface of the drum, each segment being pivotally mounted on the supporting members at each end of a common axis so that the building surface of each of the segments is movable inwardly, a cam plate located co-axially on the shaft and having a cam surface or cam surfaces, a follower attached to each segment and engaging with said cam surface, and means for relatively moving the cam plate and the followers in order that the segments may be collapsed or erected by the action of the cam surface or cam surfaces upon the followers.

A single cam surface may be provided for actuating all the segments; several cam surfaces may be provided each for actuating a group of segments; or a plurality of cam surfaces may be provided, one or two for each segment.

The former may have a building surface which is either substantially part-spherical or cylindrical in shape.

One embodiment of the invention will now be described by way of example, with reference to the accompanying drawings in which:

FIGURE 3 is a cross-sectional view of the tire former of FIGURE 1 in a collapsed state, the outline of the erected former being shown chain-dotted;

FIGURE 4 shows diagrammatically the action of a cam plate for erecting and collapsing a tire former.

Figure 1:
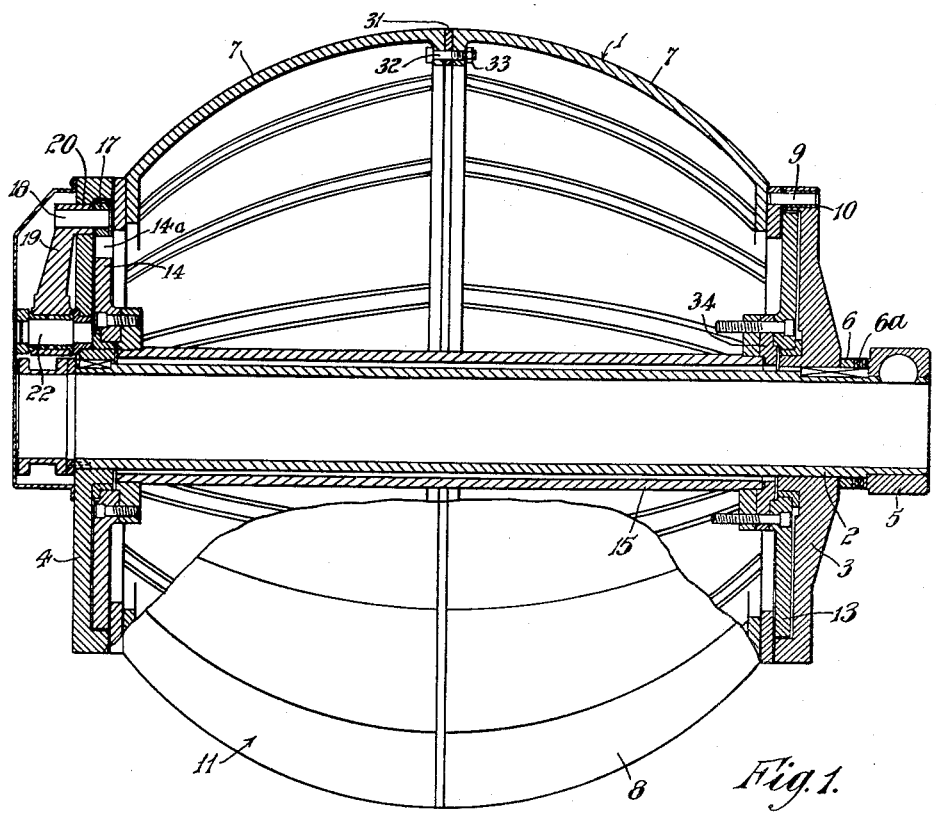
FIGURE 1 is a side view of a tire former, the left-hand half being a part cross-sectional view along the line "X—X" of FIGURE 2 and the right-hand half being a part cross-sectional view along the line "Y—Y" of FIGURE 2.
Figure 2:
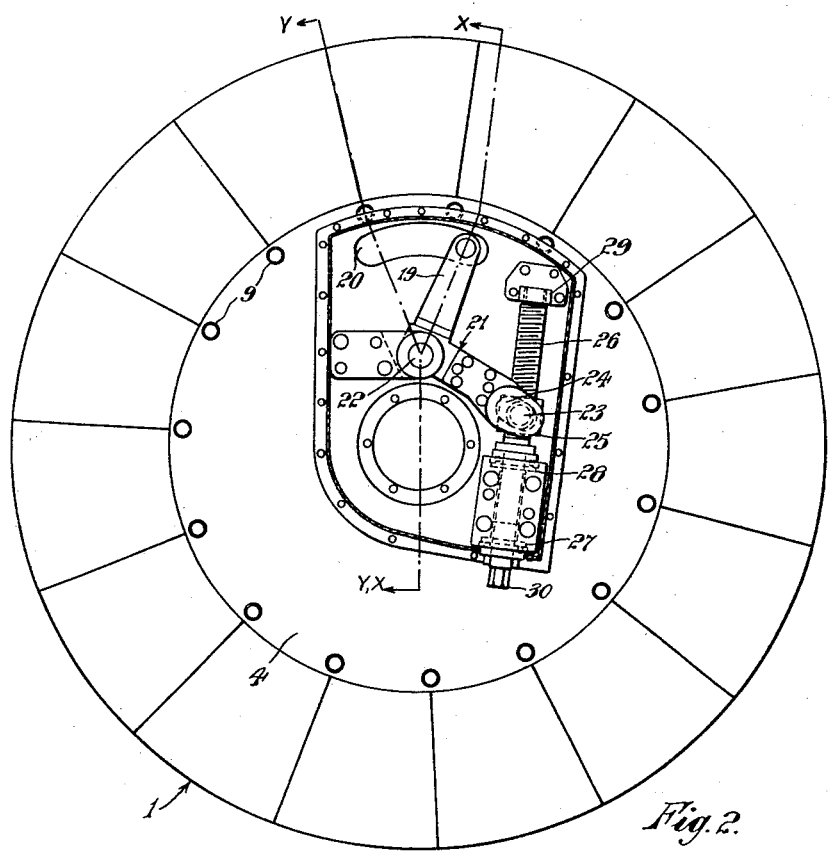
FIGURE 2 is an end view of the tire former of FIGURE 1, partly in cross-section.

A part-spherical collapsible tire building former 1 for use in the manufacture of pneumatic tire covers of the kind described in said co-pending application Ser. No. 491,295 is supported on a hollow shaft 2.

A pair of axially spaced-apart annular supporting plates 3 and 4 are drivably attached to the shaft 2 adjacent to its ends, the plate 3 being spaced from a fixed collar 5 located at an end of the shaft by means of a sleeve 6 and packing pieces 6a, sleeves of various sizes and various numbers of packing pieces being utilizable so that the distance between the supporting plates 3 and 4 may be varied in order to adjust the width of the former to the required size as will be more readily appreciated as the description proceeds.

Fifteen segments 7 each having a part-spherical surface 8 and having a pivot 9 on each end, the pairs of pivots 9 being mounted on a common axis, are supported in bearings 10 provided in the supporting plates 3 and 4. When the segments 7 are in the erected state the part-spherical surfaces 8 together constitute the former building surface 11 and each of the segments is pivotable so that its part-spherical surface 8 is movable inwardly upon collapse of the former in the manner to be later described.

Each of the segments 7 is provided at each end with a cam follower 12 (see FIGURE 4) in the form of an outwardly extending pin, the pair of cam follower pins 12 on each segment being mounted on a common axis.

The segments 7 are divided along the equatorial line of the erected former so that the required number of packing pieces 31 may be inserted in order to obtain the desired width of the former. The segment halves are secured together by means of bolts 32 and nuts 33.

Cam plates 13, 14 are mounted adjacent to opposite ends of the segments 7 co-axially with the shaft 2 and between the segments 7 and the supporting plates 3 and 4, the cam plates being rotatably interconnected by a tube 15 mounted co-axially on the former shaft. A packing piece 34 is interposed between the end flange of the tube 15 and the cam plate 13. In order to allow variations to be made in the width of the former as described above, packing pieces of different thickness are employed. Fifteen slots 16 are provided on each cam plate in spaced-apart relationship on a common pitch circle, each of the cam slots 16 being in engagement with a follower 12 and the slots being L-shaped, so that on rotation of the cam plate from position "A" to position "B," each cam follower 12 is constrained to move in an arc of a circle so as to move its associated segment inwardly to collapse the former.

The cam plate 14 is provided with a slot 14a (see FIGURE 1). A shaft 18 attached to an arm 19 passes through a slot 20 in the end plate 4 and a bushed end 17 of the shaft 18 is engageable with the walls of the slot 14a to rotate the cam plate.

The arm 19 forms part of a bell-crank lever 21 which is rotatable about a pivot 22 fixed to the end plate 4. The other arm 21 of the bell-crank lever is provided with a slot 24 in which one end of a pin 23 is slidable, the pin being attached to an internally screw-threaded nut 25 engaging with a screwed shaft 26. The screw 26 is supported in bearings 27, 28 and 29 attached to the end plate 4, and can be rotated by means of a brace (not illustrated) which is engageable with the hexagonal end 30 of the shaft 26.

When the screw 26 is rotated, the bell-crank lever 21 turns about the pivot 22 and the cam plates 13 and 14 are caused to rotate. The slots 16 in the cam plates move the cam followers 12 from position "A" to position "B" (see FIGURE 4) or vice-versa, according to the direction of rotation of the screw, and hence rotating the segments about their pivots 9 to collapse the segments or erect them to produce a smooth and continuous part-spherical building surface.

In an alternative construction, a cam plate is provided which is drivably connected to a gear wheel. A pinion is located in engagement with the gear wheel and is rotatable by means of a crank to erect or collapse the former.

Having now described my invention, what I claim is:

1. A collapsible tire building former comprising a shaft, a pair of axially spaced-apart supporting members rigidly attached to the shaft, a plurality of segments which together form the building surface of the drum, each segment being pivotally mounted on the supporting members at each end of a common axis so that the building surface of each of the segments is movable inwardly, a cam plate rotatably mounted on the shaft and having a plurality of cam surfaces one for each segment, a follower attached to each segment and engaging with one of said cam surfaces, and means for rotating the cam plate relatively to the followers to collapse and erect the segments alternatively.

2. A collapsible tire building former according to claim 1 having two identical cam plates, one cam plate being located adjacent to each end of the former co-axially with the shaft, and the cam plates having cam surfaces engageable with followers attached to the segments and being rotatable to erect or collapse the segments.

3. A collapsible tire building former according to claim 1 having, in the erected state, a substantially part-spherical building surface.

4. A collapsible tire building former according to claim 1 having in the erected state a substantially cylindrical building surface.

5. A collapsible tire building former according to claim 1 in which the means for relatively rotating the cam plate and the followers comprises a bell-crank lever rotatably mounted on a supporting plate, one of the arms of the bell-crank lever engaging a slot in the cam plate and the other arm being provided with a slot having in engagement therewith a pin movable by means of a screw-thread and nut so as to rotate the bell-crank lever.

6. The collapsible tire building former of claim 1 in which the pivotal axes of the segments are within the inner periphery of the building surface of the drum.

7. The collapsible tire of claim 1 in which the segments are of the same size and shape and in which their pivotal axes are spaced equi-angularly about the axis of the former and turn simultaneously in the same direction on their respective axes.

8. A collapsible tire carcass former having a forming surface of truncated spheroidal curvature between circular edges equidistant from the equatorial line of said former which comprises a supporting member within said former adjacent to each of the edges of the former; a series of former sections arranged circumferentially about a common axis, each section having a surface of spheroidal curvature to form a part of said forming surface and each pivoted on said supporting member radially inwardly of and adjacent the edges of said forming surface, each of said sections having a width circumferentially of said forming surface to permit it to swing on its pivotal axis to a position entirely within a cylindrical limit defined by the edges of said former; and means to swing said sections on their pivotal axes from expanded position with their spheroidal surfaces in a common spheroidal forming surface to collapsed positions within said cylindrical limit to permit a tire carcass formed on said former to be withdrawn axially.

9. The collapsible tire carcass former of claim 10 in which the pivotal swinging axis of each section is parallel to said common axis.

10. The collapsible tire carcass of claim 8 in which said means to swing said sections comprises a cam member rotatable on the axis of the former and having a cam surface for each section and a cam follower for each section engaging one of said cam surfaces.

References Cited in the file of this patent

UNITED STATES PATENTS

| | | |
|---|---|---|
| 396,752 | Laraway | Jan. 29, 1889 |
| 2,043,937 | Templeton | June 9, 1936 |
| 2,514,215 | Stevens et al. | July 4, 1950 |
| 2,614,057 | Ericson et al. | Oct. 14, 1952 |
| 2,715,933 | Frazier | Aug. 23, 1955 |